United States Patent
Stiegler et al.

(10) Patent No.: US 7,623,541 B2
(45) Date of Patent: *Nov. 24, 2009

(54) APPARATUS FOR TRANSMITTING AN ANISOCHRONIC DATA STREAM ON AN ISOCHRONIC TRANSMISSION ROUTE

(75) Inventors: Andreas Stiegler, Ettlingen (DE); Harald Schöpp, Ettlingen (DE); Frank Bähren, Karlsruhe (DE)

(73) Assignee: SMSC Europe GmbH, Karlsruhe (DE)

( * ) Notice: Subject to any disclaimer, the term of this patent is extended or adjusted under 35 U.S.C. 154(b) by 346 days.

This patent is subject to a terminal disclaimer.

(21) Appl. No.: 11/675,925

(22) Filed: Feb. 16, 2007

(65) Prior Publication Data

US 2007/0237173 A1 Oct. 11, 2007

Related U.S. Application Data

(63) Continuation of application No. 09/993,308, filed on Nov. 23, 2001, now Pat. No. 7,180,907.

(51) Int. Cl.
*H04B 7/212* (2006.01)
(52) U.S. Cl. ...................................... 370/443
(58) Field of Classification Search ................. 370/465, 370/443, 350, 230, 395, 236, 253, 422
See application file for complete search history.

(56) References Cited

U.S. PATENT DOCUMENTS

| 5,065,396 | A | 11/1991 | Castellano et al. |
|---|---|---|---|
| 5,317,561 | A | 5/1994 | Fischer et al. |
| 5,875,192 | A | 2/1999 | Cam et al. |
| 6,002,692 | A | 12/1999 | Wills |
| 6,222,858 | B1 | 4/2001 | Countermann |
| 6,678,275 | B1 * | 1/2004 | DeGrandpre et al. ..... 370/395.7 |
| 6,891,797 | B1 * | 5/2005 | Frouin ........................ 370/230 |
| 7,180,907 | B2 * | 2/2007 | Stiegler et al. .............. 370/465 |

OTHER PUBLICATIONS

Siegmund, Gerd "Network Engineering", pp. 1-70, 272, 806-814,836-848,858, 884-885, 4th Revised and Expanded Edition, Heidelberg:Hüthig (1999).
Sietmann, Richard "Multimedia-Netze furs Auto", pp. 54-55, Funkschau, Heft 23 (1999).

(Continued)

*Primary Examiner*—Hong Cho
*Assistant Examiner*—Prenell P Jones
(74) *Attorney, Agent, or Firm*—O'Shea Getz P.C.

(57) ABSTRACT

To transmit an anisochronic data stream on an isochronic transmission route with a plurality of channels over a transmission network, a number of channels is reserved by the transmitter before beginning the transmission, where the sum of the transmission capacities of the reserved channels just exceeds the bandwidth of the asynchronous data stream. During the course of transmission, the data of the anisochronic data stream are formed into packets; each packet is transmitted over the reserved channels. After a packet has been sent, unused portions of the reserved channels are filled with filler data that is discarded at the receiver, until sufficient data are again available at the transmitter to begin transmission of the next packet.

17 Claims, 2 Drawing Sheets

OTHER PUBLICATIONS

Teichner, Detlef "Netzwerk-Konzepte für Video-und Audiofunktionen im Auto", pp. 119-124, Fernseh-und Kino Technik 54, Jahrgang, Nr. 3 (2000).

Aguilar-Igartua et al. "Inverse Multiplexing for ATM Operation, Applications and Performance Evaluation for the Cell Loss Radio", IEEE International Conference on ATM, Jun. 1999, pp. 472-481.

Zitek, P. "Control Synthesis of Systems with Hereditary Properties", Control Applications, 1994. Proceedings of the Third IEEE Conference on Aug. 24-26, 1994, pp. 1189-1194, vol. 2.

Zitek, P. "Anisochronic Inverse-Based Control of Time Delay Systems, "Control 1998, UKACC International Conference on Sep. 1-4, 1998, pp. 1409-1414, vol. 2.

* cited by examiner

APPARATUS FOR TRANSMITTING AN ANISOCHRONIC DATA STREAM ON AN ISOCHRONIC TRANSMISSION ROUTE

PRIORITY INFORMATION

This application is a continuation of Ser. No. 09/993,308 filed Nov. 23, 2001 now U.S. Pat. No. 7,180,907.

BACKGROUND OF THE INVENTION

The invention relates to an apparatus that allows an isochronic transmission route (i.e., a digital transmission route operated with a given system clock pulse) to transmit anisochronic data (i.e., data with a frequency different than the operating frequency of the transmission route).

The transmission of data (e.g., audio data) having a particular assigned frequency for further processing or reproduction can encounter the problem that the data must be transmitted on a clocked transmission route whose operating frequency differs from this assigned frequency. One possibility of transmitting anisochronic data on such a route is to convert the assigned frequency to obtain an intermediate data stream with the operating frequency of the transmission route. The intermediate data stream is transmitted over the transmission route, and at the receive side converted again to the assigned frequency. For example, in the case of a data stream that includes an audio signal whose assigned frequency is the sampling frequency of the audio signal, this frequency can be converted by converting the signal to an analog signal and then sampling and re-digitizing the analog signal at the operating frequency of the transmission route.

However, a problem with this technique is that it is relatively complicated and expensive because of the rate converters needed at both ends of the transmission route. In addition, performing a digital-to-analog conversion and an analog-to-digital conversion causes a loss of quality in the audio signal and generally a loss of some information. If the operating frequency of the transmission route is less than the original sampling frequency, information loss is unavoidable even if the analogizing and digitizing processes are assumed to be ideally error-free, because high-frequency spectral components are suppressed during transmission.

Therefore, there is a need for an apparatus that provides a transmission system to transmit an anisochronic data stream, regardless of the operating frequency of the transmission route and of the frequency assigned to the data stream.

SUMMARY OF THE INVENTION

Briefly, according to an aspect of the invention, a data transmission system includes a data bus and a data source that provides an anisochronic data stream. A transmitter receives the anisochronic data stream, and assigns a plurality of channels associated with the data bus for transmission of data indicative of the anisochronic data stream. The transmitter also partitions the anisochronic data into a plurality of packets and fills unused bit locations of the plurality of packets with filler data, and provides output packets indicative thereof. A first bus interface receives the output packets and transmits the output packets onto the data bus. A second bus interface receives the output packets on the data bus, and provides input packets indicative thereof. A receiver receives and processes the input packets to recover the anisochronic data stream, and provides a recovered anisochronic data stream indicative thereof.

Before transmission begins a number of channels of the transmission route are reserved, such that the sum of the transmission capacities of the reserved channels just exceeds the bandwidth of the anisochronic data stream. In a preferred embodiment, the number of channels reserved is those needed to have available just more transmission capacity than corresponds to the bandwidth of the anisochronic data stream. In the course of transmission, packets are formed from the data of the anisochronic data stream. Each of these packets is transmitted by utilizing the reserved channels. After a packet has been transmitted, the channels are filled up with filler data until enough data have again been collected at the transmitter to send another packet without interruption. The filler data are discarded at the receiver, to reestablish the original anisochronic data stream.

To facilitate distinguishing useful data from filler data in the data stream received from the transmission route, a synchronization pattern is preferably transmitted when transmission of each packet begins. The synchronization pattern signals to the receiver that the subsequent data is useful data.

The amount of useful data transmitted in each packet is preferably fixed. Consequently, after receiving this fixed quantity of data, the receiver can interrupt reception and stop processing the data stream from the transmission route, until a synchronization pattern again signals a new transmission of useful data.

These features permit arbitrary, even non-commensurable, ratios between the frequency assigned to the data stream and the operating frequency of the transmission route. Such frequency ratios can indeed have the result that the quantity of filler data transmitted between two successive useful data blocks varies. However, since the filler data is ignored by the receiver, this does not cause the reestablishment/recovery of the original anisochronic data stream to be more complicated on the receiving end.

The channels of the transmission route are preferably time multiplex channels. The transmitter thus has available cyclically changing time slices of the various channels to transmit the data. The transmitter decomposes the data words of a packet obtained from an external source into units with the width of the channels, and transmits the resulting units sequentially in free time slices of a reserved channel.

The present invention is especially suitable for transmitting streams of audio data. It can be used for example for a single audio channel, the left or the right channel of a stereo signal, etc. In particular, in the case of a stereo signal or other audio signals comprising several channels, it can be more economical for the transmission to form the audio stream by nesting the data of several audio channels.

A MOST network is preferably used as the transmission route. Such a network preferably operates at a frequency of 44.1 kHz, corresponding to the sampling frequency of a conventional CD. A DVD player, by contrast, yields a data stream whose individual output channels each have a sampling rate of 48 kHz. In one embodiment, the method is especially suited for transmitting the anisochronic data stream delivered by a DVD player on a MOST network. The anisochronic data stream can be a single audio channel of the DVD player with a sampling frequency of 48 kHz, or it can be composed of several audio channels of the DVD player. In the latter case, a generalized sampling frequency, which is an integer multiple of 48 kHz, will correspond to this data stream.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
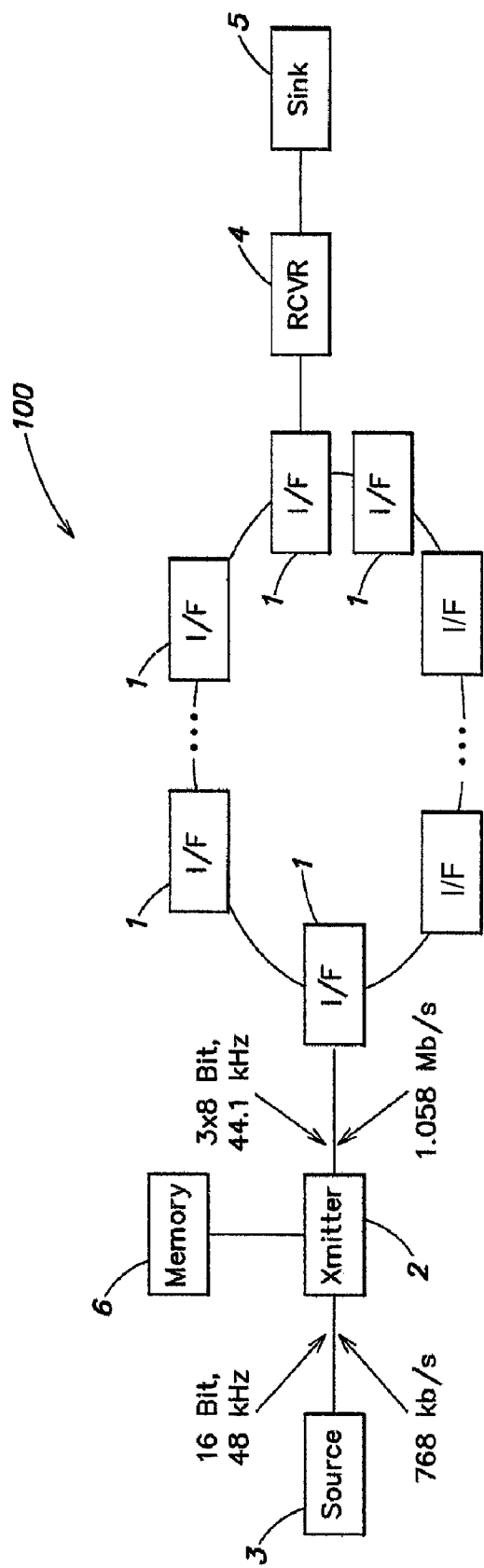
FIG. 1 is a block diagram illustration of a MOST network with a source and sink for anisochronic data connected to it.

FIG. 1 is a block diagram illustration of a MOST network 100 with a source 3 and sink 5 for anisochronic data connected to it. The MOST network 100 includes a plurality of MOST interfaces 1, which are connected to one another in a ring structure. A transmitter 2 is connected to one of the interfaces 1. The transmitter 2 receives data, for example, having a word width of sixteen bits and a word frequency of 48 kHz from the source 3 (e.g., a DVD player). The transmission rate from the DVD player 3 to the transmitter 2 thus is 768 kb/s.

The MOST network 100 between the interfaces 1 transmits data with a word width of eight bits. The transmission time on the network is divided into frames with a repeat frequency of 44.1 kHz, where each frame includes N time slices. In this embodiment, each of the N time slices is an 8-bit-wide data word which can be transmitted. The cyclically repeating N time slices form N channels with a transmission capacity of 352.8 kHz (8 bits×44.1 kHz).

A receiver 4 receives from its associated interface 1 data circulated on the MOST network 100 by the transmitter 2. The receiver 4 reconverts the data stream into one with the original format delivered by the source 3 (e.g., DVD player 3) to the transmitter 2, and forwards the converted data stream to the sink 5 (e.g., an amplifier with a connected loudspeaker). The mode of operation of the transmitter 2 and of the receiver 4 will now be described with reference to FIGS. 2 and 3.

To transmit data from a DVD player over a MOST bus, three channels must be reserved for the data from the DVD player. Specifically, since the DVD player provides data at 768 kb/s, and each channel has a bandwidth of 352.8 kb/s, then three channels provide a bandwidth of 1.0584 Mb/s (3×352.8 kb/s), which is sufficient to transmit the data from the DVD player.

Figure 2:
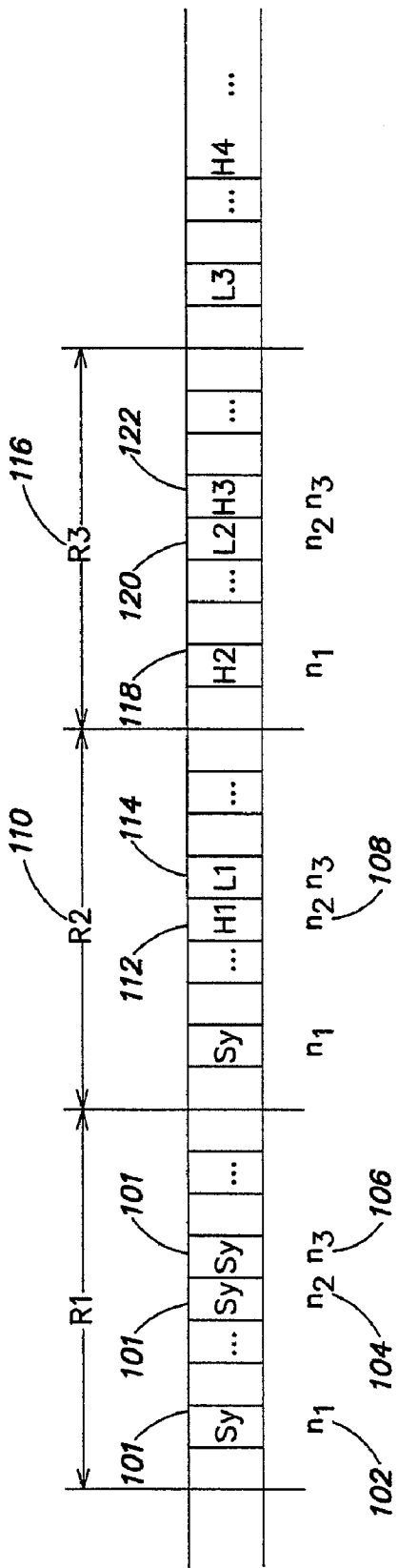
FIGS. 2 and 3 are pictorial illustrations of the transmission of the anisochronic data on the MOST network.
Figure 3:
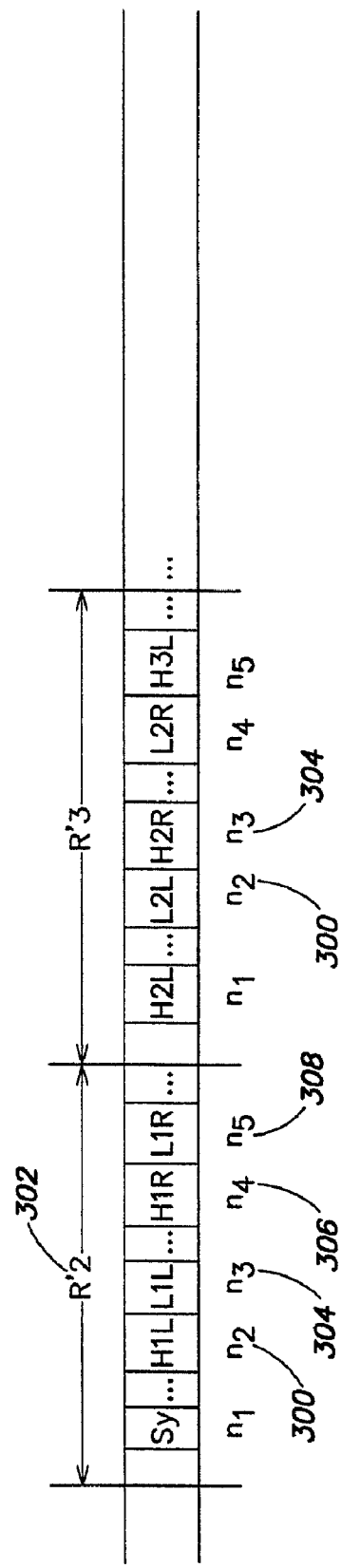

Before the transmitter 2 begins to output data to the interface 1 assigned to it, the transmitter 2 first collects data received from the player 3 in a FIFO intermediate memory 6 until M data words have been collected there. The number M of data words depends on the size of the packets in which the data subsequently will be transmitted on the MOST network 100. As soon as the required data quantity is present in the intermediate memory 6, the transmitter 2 begins to send a synchronization pattern Sy 101 as illustrated in FIG. 2, on the channels $n_1$ 102, $n_2$ 104, $n_3$ 106 assigned to it. When the receiver 4 receives the synchronization pattern Sy, it recognizes that the following transmission will be a packet of M data words, which must be processed and forwarded to the sink 5.

Following the synchronization pattern Sy beginning with the time slice $n_2$ 108 of frame R2 110, the transmitter 2 begins to transmit the content of the intermediate memory 6, here first with the most significant byte H1 112 and subsequently, in the time slice $n_3$, with the least significant byte L1 114 of the first 16-bit-wide data word stored in the intermediate memory 6. In frame R3 116, bytes H2 118 and L2 120 respectively of a second data word and byte H3 122 of a third data word are transmitted.

While the transmitter 2 is processing the content of the intermediate memory 6 in this manner, the source 3 re-supplies data that is entered in the intermediate memory 6, before they are transmitted. Since the transmission data rate of 1.0584 Mb/s is greater than the rate at which the source 3 re-supplies data, the number of data words contained in the intermediate memory 6 declines in the course of transmission. However, the number M data words depend on the data rates of the player 3, of the transmitter 2, and of the packet size M. The data rate is chosen so that the intermediate memory does become empty before a complete packet of M data words has been transmitted on the MOST network. As soon as this number M of data words has been reached, the transmitter 2 outputs filler data (e.g., bytes with the value 0) to the MOST network, until the intermediate memory 6 again contains M data words, which is a sufficient data supply for transmitting another data packet without interruption.

After the receiver 4 has received the synchronization pattern, it outputs to the sink 5 the subsequently received M data words, reformatted into data words of 16-bit-width with a frequency of 48 kHz (i.e., in the same format as they were delivered from the player 3). After the sink has received the M data words, it ignores the data subsequently transmitted on the channels reserved for the transmission, until it receives the next synchronization pattern.

In the example where the source 3 is a DVD player, the ratio of the data rates of the source 3 and the transmitter 2 is such that filler data are transmitted on the network for about one-quarter of the time. However, in another embodiment, a more efficient utilization of the transmission capacity can be achieved if the anisochronic data stream delivered by the source 3 is composed of several audio channels, each of which includes 16-bit-wide data words with a sampling frequency of 48 kHz. As an example, transmission of a stereo signal is considered in FIG. 3. In this case, the total data rate of the source 3 is 1536 kb/s (2×768 kb/s). To transmit this anisochronic data stream indicative of the stereo signal on the MOST network 100, five channels must be reserved, corresponding to a transmission rate of 1674 kb/s.

After a supply of M data words has been collected in the buffer 6 (where the numerical value of M here is different than in the case of FIG. 2), the transmitter 2 (FIG. 1) begins to transmit useful data in time slice $n_2$ 300 of the frame R'2 302. In the time slices $n_2$ 300, $n_3$ 304, the transmitter 2 always sends the most significant and least significant byte H1L, L1L of the first data word of the left channel of the stereo signal. Also, in the time slices $n_4$ 306, $n_5$ 308, the transmitter 2 transmits the corresponding bytes H1R, L1R of the first data word of the right channel. In the subsequent frame R'3, the second data words of the two channels are transmitted and, in time slice $n_5$, the most significant byte H3L of the left word of the left channel is transmitted. As already described with reference to FIG. 2, the transmitter 2 continues to transmit until the given number M of data words of a packet has been reached, and following this the transmitter 2 transmits filler data until the intermediate memory 6 again has reached the required data complement of M data words. As soon as this is the case, the transmitter 2 transmits a new synchronization pattern, and the cycle repeats. With this variant, the fraction of time during which filler data are transmitted on the MOST network 100 is less than 10%. As a result, the transmission capacity of the network is used more efficiently.

The present invention has been described in one embodiment by way of example as a DVD player operating as the data source 3, and a MOST network 100 as a transmission route. However, one of ordinary skill will of course recognize that the present invention also applies to data sources other than a DVD player, and synchronous transmission routes other than a MOST bus.

Although the present invention has been shown and described with respect to several preferred embodiments thereof, various changes, omissions and additions to the form and detail thereof, may be made therein, without departing from the spirit and scope of the invention.

What is claimed is:

1. A method of transmitting an anisochronic data stream from a data source to a data sink over a isochronic transmission network having with a plurality of channels, comprising:
   receiving data from the data source, and reserving at least two of the plurality of channels to provide reserved channels for transmission of data from the transmitter onto the transmission network, where the cumulative transmission capacities of the reserved channels exceeds the bandwidth of the asynchronous data stream;
   partitioning data of the anisochronic data stream into packets;
   filling bit locations of the packets not required to transmit the anisochronic data with filler data, and providing packetized data indicative thereof; and
   providing the packetized data for transmission over at least one reserved channel of the transmission network.

2. The method of claim 1, where the step of providing the packetized data comprises inserting a synchronization pattern into the packetized data before data associated with the anisochronic data, to identify the portions of the data of the packetized data as data indicative of the anisochronic data.

3. The method of claim 1, where the packets each have the same data quantity.

4. The method of claim 1, where the reserved channels are time multiplexed channels, and the transmission network includes a time division multiplexed bus.

5. The method of claim 1, where the anisochronic data stream comprises audio data.

6. The method of claim 1, where then transmission network comprises a MOST network.

7. The method of claim 6, where the MOST network operates at a frequency of 44.1 MHz, and the anisochronic data stream has a frequency of 48 MHz or an integer multiple thereof.

8. The method of claim 1, where the data source comprises a DVD player.

9. The method of claim 1, where the data source comprises a CD player.

10. A data transmission system, comprising:
    a data bus;
    a data source that provides an anisochronic data stream;
    a transmitter that receives the anisochronic data stream, assigns a plurality of channels associated with the data bus for transmission of data indicative of the anisochronic data stream, partitions the anisochronic data into a plurality of packets, and fills unused bit locations of each packet with filler data, and provides output packets indicative thereof;
    a first bus interface that receives the output packets and transmits the output packets onto the data bus;
    a second bus interface that receives an output packets on the data bus, and provides input packets indicative thereof; and
    a receiver that receives and processes the input packets to recover the anisochronic data stream, and provides a recovered anisochronic data stream indicative thereof.

11. The data transmission system of claim 10, where the data bus includes a MOST bus.

12. The data transmission system of claim 11, where the data source includes a DVD player.

13. The data transmission system of claim 10, where the MOST bus operates at a frequency of 44.1 kHz, and the anisochronic data stream has a frequency of 48 kHz or an integer multiple thereof.

14. The data transmission system of claim 13, where the reserved channels are time multiplexed channels, and the data bus is configured and arranged as a time division multiplexed bus.

15. The data transmission system of claim 10, further comprising an intermediate memory device where the transmitter stores data indicative of the anisochronic data stream, and when a certain amount of data associated with the anisochronic data stream has been stored in the intermediate memory, the transmitter initiates providing the output packets.

16. The data transmission system of claim 15, where the transmitter also provides to the first bus interface a synchronization pattern that is transmitted over the data bus prior to the packets associated with the anisochronic data stream to identify to the receiver the data associated with the anischronic data stream.

17. An apparatus for transmitting an anisochronic data stream from a data source to a data sink over a isochronic transmission network having with a plurality of channels, comprising:
    means for receiving data from the data source, and for reserving at least two of the plurality of channels to provide reserved channels for transmission of data from the transmitter onto the transmission network, where the cumulative transmission capacities of the reserved channels exceeds the bandwidth of the asynchronous data stream;
    means for partitioning data of the anisochronic data stream into packets;
    means for providing bit locations of the packets not required to transmit the anisochronic data with filler data, and for providing packetized data indicative thereof; and
    means for providing the packetized data for transmission over at least one reserved channel of the transmission network.

* * * * *

UNITED STATES PATENT AND TRADEMARK OFFICE
CERTIFICATE OF CORRECTION

PATENT NO. : 7,623,541 B2  Page 1 of 2
APPLICATION NO. : 11/675925
DATED : November 24, 2009
INVENTOR(S) : Stiegler et al.

It is certified that error appears in the above-identified patent and that said Letters Patent is hereby corrected as shown below:

Column 4
Line 11, after "does" insert --not--

Column 5
Line 12, before "isochronic", delete "a" and insert --an--
Line 13, delete "with"
Line 16, delete "from the transmitter"
Line 19, delete "asynchronous" and insert --anisochronic--
Line 22, delete "filling" and insert --providing--
Line 23, delete "anischronic" and insert --anisochronic--
Line 31, delete "anischronic" and insert --anisochronic--
Line 39, delete "then" and insert --the--
Line 42, delete "MHz" and insert --kHz--
Line 43, delete "MHz" and insert --kHz--
Line 52, delete "anischronic" and insert --anisochronic--
Line 54, delete "anischronic" and insert --anisochronic--
Line 55, delete "anischronic" and insert --anisochronic--

Column 6
Line 1, delete "and fills" and insert --provides--
Line 6, delete "an" and insert --the--
Line 6, delete "on" and insert --transmitted onto--
Line 10, delete "anischronic" and insert --anisochronic--
Line 11, delete "anischronic" and insert --anisochronic--
Line 21, delete "are" and insert --comprise--
Line 26, delete "anischronic" and insert --anisochronic--
Line 27, delete "anischronic" and insert --anisochronic--
Line 33, delete "anischronic" and insert --anisochronic--
Lines 34-35, delete "anischronic" and insert --anisochronic--
Line 37, before "isochronic", delete "a" and insert --an--
Line 38, delete "with"

CERTIFICATE OF CORRECTION (continued)
U.S. Pat. No. 7,623,541 B2

Line 45, delete "asynchronous" and insert --anisochronic--
Line 50, delete "anischronic" and insert --anisochronic--

Signed and Sealed this

Twelfth Day of January, 2010

David J. Kappos
*Director of the United States Patent and Trademark Office*